(12) United States Patent
Joiner

(10) Patent No.: US 11,224,924 B2
(45) Date of Patent: Jan. 18, 2022

(54) TABLE MITER SAW

(71) Applicant: Robert Benjamin Joiner, Milledgeville, GA (US)

(72) Inventor: Robert Benjamin Joiner, Milledgeville, GA (US)

(*) Notice: Subject to any disclaimer, the term of this patent is extended or adjusted under 35 U.S.C. 154(b) by 82 days.

(21) Appl. No.: 16/747,285

(22) Filed: Jan. 20, 2020

(65) Prior Publication Data
US 2021/0220930 A1 Jul. 22, 2021

(51) Int. Cl.
| | |
|---|---|
| *B23D 45/06* | (2006.01) |
| *B23D 47/12* | (2006.01) |
| *B23D 45/14* | (2006.01) |
| *B23D 45/02* | (2006.01) |

(52) U.S. Cl.
CPC ......... *B23D 45/062* (2013.01); *B23D 45/024* (2013.01); *B23D 45/14* (2013.01); *B23D 47/126* (2013.01)

(58) Field of Classification Search
CPC .... B23D 45/06; B23D 45/061; B23D 45/062; B23D 45/065; B23D 45/02; B23D 45/021; B23D 45/024; B23D 45/025; B23D 45/14; B23D 45/022
USPC .................................... 83/477.2, 471.3, 473
See application file for complete search history.

(56) References Cited

U.S. PATENT DOCUMENTS

| | | | |
|---|---|---|---|
| 1,194,075 A * | 8/1916 | Rorick ................... F16H 3/366 74/347 |
| 2,719,547 A | 10/1955 | Gjerde et al. | |
| 2,990,862 A * | 7/1961 | Zorrod ................. B23D 47/025 144/285 |
| 3,456,697 A | 7/1969 | Rutzebeck | |
| 3,901,498 A | 8/1975 | Novak | |
| 4,249,442 A * | 2/1981 | Fittery .................... B27B 5/243 83/473 |
| 4,516,612 A * | 5/1985 | Wiley .................. B23D 45/062 144/1.1 |
| 4,532,844 A * | 8/1985 | Chang .................. B23D 45/068 474/112 |
| 4,549,455 A | 10/1985 | Perilloux, Jr. | |
| 4,587,875 A | 5/1986 | Deley | |
| 4,874,025 A * | 10/1989 | Cleveland ............ B23D 47/025 144/287 |
| 5,090,283 A * | 2/1992 | Noble .................. B23D 45/021 269/303 |
| 5,115,847 A * | 5/1992 | Taber ................... B23D 47/025 108/69 |
| 5,720,213 A * | 2/1998 | Sbervaglieri ........ B23D 45/062 83/471.3 |
| 5,722,308 A * | 3/1998 | Ceroll .................... B23Q 3/007 144/253.1 |

(Continued)

*Primary Examiner* — Richard D Crosby, Jr.
(74) *Attorney, Agent, or Firm* — Nexsen Pruet LLC; Bryan L. Baysinger

(57) ABSTRACT

Disclosed are various embodiments for a table miter saw. The table miter saw allows for cross cuts, bevel cuts, as well as miter cuts and is an improvement over common table saws. The table miter saw includes a platform, orbiting base, and a telescoping assembly that allows for pushing and pulling the saw blade apparatus for mitering safety and ease of use. Additional benefits include the ability to combine multiple carpentry and woodworking tools into one compact device that is easily transferrable to the jobsite.

9 Claims, 6 Drawing Sheets

Table Miter Saw
100

(56) References Cited

U.S. PATENT DOCUMENTS

| | | | | |
|---|---|---|---|---|
| 5,735,054 A * | 4/1998 | Cole | ................ | B23D 59/002 33/471 |
| 5,797,307 A | 8/1998 | Horton | | |
| 6,079,931 A * | 6/2000 | English, Jr. | ........... | A47B 91/002 254/8 R |
| 6,080,041 A | 6/2000 | Greenland | | |
| 6,095,533 A * | 8/2000 | Balolia | ................ | B60T 1/14 188/19 |
| 6,212,983 B1 * | 4/2001 | Pyle | ................ | B23D 45/024 144/363 |
| 6,267,701 B1 * | 7/2001 | Mott | ................ | F01L 1/022 474/148 |
| 6,684,750 B2 * | 2/2004 | Yu | ................ | B23D 45/067 83/471.3 |
| 6,739,230 B2 * | 5/2004 | Chang | ................ | B23D 45/067 83/473 |
| 6,942,229 B2 * | 9/2005 | Brazell | ................ | B25H 1/04 108/119 |
| 7,841,677 B2 * | 11/2010 | Hsieh | ................ | A47B 49/004 312/249.11 |
| 8,122,807 B2 * | 2/2012 | Gass | ................ | B27G 19/08 83/781 |
| 8,191,449 B2 * | 6/2012 | Wiezorek | ................ | B27B 5/29 83/34 |
| 8,511,693 B2 * | 8/2013 | Gass | ................ | B25H 1/04 280/43.17 |
| 10,016,824 B2 * | 7/2018 | Frolov | ................ | B23D 45/068 |
| 10,076,796 B2 * | 9/2018 | Chung | ................ | B23D 59/006 |
| 10,792,834 B2 * | 10/2020 | Garces | ................ | B23D 45/06 |
| 2002/0005103 A1 * | 1/2002 | Ceroll | ................ | B27B 5/38 83/473 |
| 2003/0000359 A1 * | 1/2003 | Eccardt | ................ | B23D 45/068 83/477.1 |
| 2005/0092155 A1 * | 5/2005 | Phillips | ................ | B23D 45/068 83/581 |
| 2005/0160895 A1 * | 7/2005 | Garcia | ................ | B27G 19/08 83/581 |
| 2005/0188806 A1 * | 9/2005 | Garcia | ................ | B27B 5/30 83/471.3 |
| 2005/0199768 A1 * | 9/2005 | Tam | ................ | B25H 1/04 248/129 |
| 2005/0247177 A1 * | 11/2005 | Hetcher | ................ | B23D 47/025 83/471.3 |
| 2006/0005683 A1 * | 1/2006 | Lambert | ................ | B27B 5/165 83/477.2 |
| 2006/0101958 A1 * | 5/2006 | Garcia | ................ | B23D 45/062 83/13 |
| 2006/0101968 A1 * | 5/2006 | Baird | ................ | B23D 45/068 83/473 |
| 2006/0201300 A1 * | 9/2006 | Schwaiger | ........... | B23D 59/002 83/473 |
| 2006/0201301 A1 * | 9/2006 | Schwaiger | ........... | B23D 45/068 83/477.1 |
| 2006/0201302 A1 * | 9/2006 | Schwaiger | ........... | B23D 45/068 83/477.2 |
| 2006/0272464 A1 * | 12/2006 | Chen | ................ | B23D 59/006 83/100 |
| 2007/0215243 A1 * | 9/2007 | Bauer | ................ | B27B 5/243 144/1.1 |
| 2007/0245869 A1 * | 10/2007 | Welsh | ................ | B27B 5/29 83/438 |
| 2008/0041210 A1 * | 2/2008 | Tseng | ................ | B23D 45/062 83/473 |
| 2008/0066598 A1 * | 3/2008 | Ouellette | ................ | B27B 5/165 83/477.2 |
| 2008/0092709 A1 * | 4/2008 | Gaw | ................ | B23D 45/066 83/473 |
| 2008/0178722 A1 * | 7/2008 | Gass | ................ | B27G 19/08 83/478 |
| 2008/0289469 A1 * | 11/2008 | Chuang | ................ | B23D 59/002 83/473 |
| 2009/0007742 A1 | 1/2009 | Nie et al. | | |
| 2009/0165624 A1 * | 7/2009 | Brown | ................ | B27B 27/02 83/477 |
| 2010/0005937 A1 * | 1/2010 | Weston | ................ | B27B 5/243 83/471.2 |
| 2010/0005939 A1 * | 1/2010 | Burke | ................ | B27B 5/243 83/473 |
| 2010/0050843 A1 * | 3/2010 | Gass | ................ | B23D 47/12 83/477.1 |
| 2010/0051138 A1 * | 3/2010 | Yu | ................ | B23D 59/002 144/420 |
| 2010/0107841 A1 * | 5/2010 | Liu | ................ | B23D 45/068 83/477.2 |
| 2010/0116261 A1 * | 5/2010 | Fairweather | ....... | B23Q 11/0067 125/13.01 |
| 2010/0307307 A1 * | 12/2010 | Butler | ................ | B23D 59/006 83/58 |
| 2011/0041667 A1 * | 2/2011 | Chiang | ................ | B27B 5/243 83/477.1 |
| 2011/0067540 A1 * | 3/2011 | Frolov | ................ | B23D 47/025 83/467.1 |
| 2011/0100183 A1 * | 5/2011 | Tomaino | ................ | B23D 45/068 83/473 |
| 2011/0271810 A1 * | 11/2011 | Brown | ................ | B23D 59/003 83/522.18 |
| 2015/0007702 A1 * | 1/2015 | Joiner | ................ | B27G 5/02 83/13 |
| 2015/0020668 A1 * | 1/2015 | Gass | ................ | B27B 5/181 83/471.3 |
| 2016/0121412 A1 * | 5/2016 | Fulmer | ................ | B23D 47/025 83/477.2 |
| 2016/0332244 A1 * | 11/2016 | Koegel | ................ | B23Q 17/2419 |
| 2019/0084178 A1 * | 3/2019 | Lucas | ................ | B27B 9/04 |

\* cited by examiner

TABLE MITER SAW

FIELD

The present invention relates to advancements and improvements in table saws, miter saws, radial arm saws, and other mechanically operated carpentry and woodworking equipment. In particular, the present invention improves the table saw by adding advancements that allow for mitering and increased safety in carpentry and woodworking environments.

BACKGROUND

A table saw, also known as a bench saw or saw bench, is a mechanical tool utilized for woodworking that comprises a circular cutting blade, a mounted arbor, and a motor to drive the blade. In modern adaptations a table saw has an adjustable blade that can be adjusted up and down for cut depth as well as tilt on an axis to cut at a degree from the origin of 90 degrees. That is, the saw blade may rotate from the perpendicular position to form a new position allowing for an angled upright cut. A miter saw or chop saw is a mechanical tool utilized in woodworking for crosscuts along the wood grain. Advancements in miter saws led to the development of the radial arm saw, which allows for a sliding miter saw to allow for longer cuts and pull through cuts. The table saw and the miter saw are well known tools in wood working and each serve a respective purpose. Typical woodworking projects at a construction site require workers to bring with or have delivered both a table saw and a miter saw, along with many other wood working tools. There is a long-sought need to combine the advantages of both the table saw and the miter saw in order to increase work environment efficiency and improve results with less equipment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A system and assembly for a table miter saw is disclosed herein. Improvements and advancements in the table saw to add mitering capability are further disclosed. In the following discussion, a general description of the system and assembly is provided, along with the components in the respective claims. Other technical advantages may become readily apparent to one of ordinary skill in the art after review of the following figures and description, beginning with FIG. 1.

Table saws, also referred to as bench saws, are designed to cut wood at lengths or across the grain. This process is often called ripping the wood and the latter is a cross cut. Common components of a table saw include a motor unit. The motor unit often contains an electric motor that spins a shaft connected by belts to the arbor. Additional motor units are known and disclosed herein such as gasoline powered motor units and hydraulic motor units. The arbor is held in place by bearings and a retainer assembly, between which the saw blade is sandwiched and held in place by an arbor flange and arbor nut. Often times the arbor shaft is raised and lowered by a worm gear attached to the arbor bracket and an arbor raising handwheel services the blade to move it in a vertical direction from the ground. Additionally, the saw blade is often equipped with a tilt adjustment that allows for angled cuts.

Figure 1:
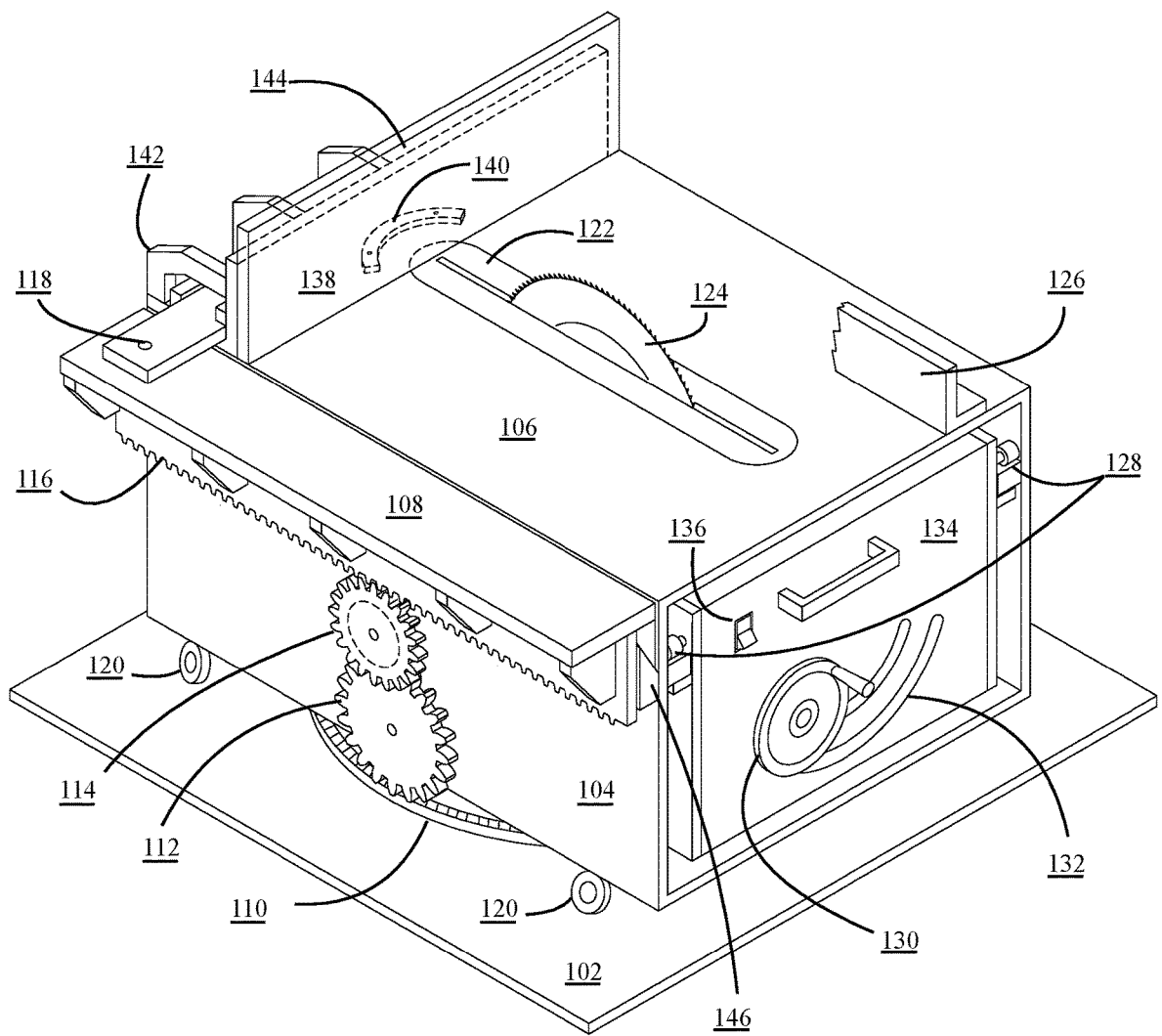
FIG. 1 is a schematic diagram of an example embodiment of a table miter saw as disclosed herein.

In the example embodiment of FIG. 1 a table miter saw (100) is disclosed. The table miter saw (100) is equipped with a bottom platform (102). The bottom platform (102) is a platform upon which provides stability and a base for the table miter saw (100). The bottom platform can be made out of any material capable of handling typical carpentry loads that include the table miter saw assembly plus the weight of any material being processed by the table miter saw (100). Notably, the bottom platform (102) can be equipped with leg extensions or secured to a tabletop or work table for increased rigidity.

The swivel gear assembly, in the example embodiment of FIG. 1 includes the bottom bevel gear (110), the top bevel gear (112), the compound gear (114), and the rack gear (116). These gears combine to allows the table miter saw (100) to miter at a selected angle or degree. The bottom bevel gear (110) is attached to the bottom platform (102) and the teeth of the bottom bevel gear (110) are oriented to receive the top bevel gear (112). Pitch surface and pitch angle of the bottom bevel gear (110) and the top bevel gear (112) can be adjusted and in the example embodiment of FIG. 1 a crown gear is displayed. Other types such as an internal bevel gear and other geometries are anticipated and disclosed herein. The compound gear (114) is configured to receive input from the top bevel gear (112) so that when the bottom bevel gear (110) is adjusted the top bevel gear (112) moves to adjust the compound gear (114). The compound gear (114) in turn moves the rack gear (116) to swivel the side shelf (108) and the orbiting base (104). A pivot joint (118) maintains the swivel between the side shelf (108) and the orbiting base (104). A side shelf rail system (146) holds the side shelf (108) in place as it swivels along the side of the orbiting base (104). The side shelf rail system (146) is a deep groove that slows the free travel of the side shelf (108) alongside the orbiting base (104).

The swivel gear assembly maintains the swivel action for miter cuts by rotating the orbiting base (104) on the bottom bevel gear (110). The top bevel gear (112) connects to the compound gear (114) and the rack gear (116) to move the side shelf (108) and the table top shelf (106). The gear ratio is dependent upon the size of the gear and the amount of movement desired. In the example embodiment of FIG. 1 the bottom bevel gear (110) is 180 degrees around. The 180-degree bottom bevel gear allows for full miter cuts and controls the movement of the side shelf (108) so as to remain in contact and not overextend the radius of the miter angle.

In the example embodiment the side shelf (108) sits in the guide rail (146) for movement and is attached to the top shelf (106) through a swivel joint (118) connected to a rear fence rail system (142) that holds the rear rail in place on the top shelf (106). The rear fence (144) maintains the angle or degree selected for the miter cut. On the top shelf (106) a throat plate (122) enables the saw blade (124) to travel telescopically in the orbiting base (104) as part of the telescoping base (134) to miter by moving the blade in a horizontal direction on the top shelf (106). The telescoping base (134) sits on a trolley system (128) that consists of rails and casters that allow the telescopic movement of the telescoping base so as to move the saw blade (124) along the path of the throat plate (122). In this manner the user can push and pull the telescoping base (134) to make the associated miter cuts. The casters in the example embodiment are typical bearing-based casters that allow the telescoping base to travel freely on the side rails attached to the orbiting base (104). In additional embodiments a worm gear may be added in place of the casters, or any other assembly such as bearings that would allow the telescoping base to travel along the inside of the orbiting base (104). In the example embodiment of FIG. 1 the telescoping base (134) can be locked in place for rip cuts or cross cuts and unlocked and used telescopically for miter cuts. The telescoping base (134) contains the saw blade motor and accommodates the weight of the saw blade motor. Additionally, a power switch (136) and handle assembly is provided in FIG. 1. The telescoping base (134) also contains the blade height wheel (130) for adjusting the height of the saw blade (124) and the blade tilt adjustment (132) for tilting the saw blade (124) to make beveled cuts.

Continuing with the example embodiment of FIG. 1, the rip fence (126) aids in ripping cuts when the table miter saw is engaged in the table saw configuration. In the table saw configuration the rear fence (144) and the rear fence rail system (142) may be removed. The rear fence rail system rotates on the top shelf (106) in a trunnion groove (140) that is configured with a trunnion bearing (138). The trunnion groove (140) enables the selection of a miter angle and also allows the side shelf to rotate alongside the top shelf (106). In this configuration as the orbiting base (104) rotates on the bottom bevel gear (110), the top bevel gear (112) rotates the compound gear (114) that moves the rack gear (116) which pushes the side shelf in the side shelf rail system (146) and keeps it align with the degree of miter in the trunnion groove (140).

In the example embodiment of FIG. 1, the miter configuration includes the rear fence rail system (142) and a rear fence (144) mounted on the top shelf (106) and configured with the trunnion groove (140). As the side shelf (108) pivots for differing miter cuts the rear fence rail system (142) glides along the top shelf (106) and utilizes the trunnion groove (140) with a mounted trunnion bearing (138). Additional embodiments such as a guide system or gear assembly may be used in lieu of a trunnion bearing and trunnion groove.

Figure 2:
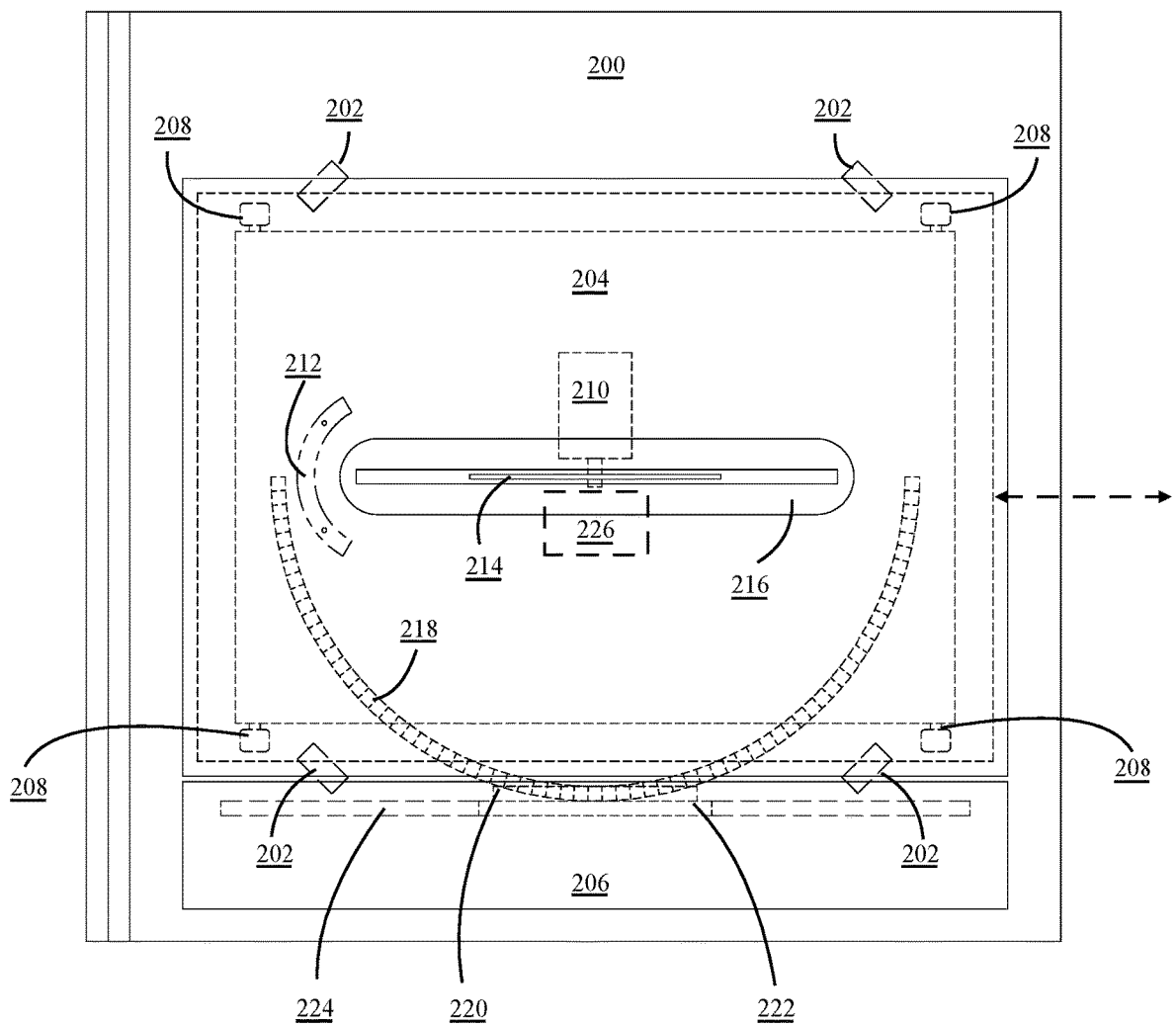
FIG. 2 is a top down view schematic diagram of an example embodiment of a table miter saw as disclosed herein.

Turning to FIG. 2, a top down view of an example embodiment of a table miter saw is given. The bottom platform (200) has the bottom bevel gear (218) affixed and held to the bottom platform (200). The bottom bevel gear (218) is a 180-degree bevel gear and the weight bearing bottom swivel (226) is depicted showing the orbiting base (201) is supported by the bottom swivel (226) and is configured to the bottom bevel gear (218) through the rotating gear assembly. The means of contact are the side shelf (206) working through the rack gear (224) to swivel the miter table saw into a desired miter configuration by rotating the orbiting base (201) and influencing the bottom bevel gear (218) on the swivel gear assembly. Internal to the orbiting base (201) the telescoping base resides on a set of four trolley system casters (208). In alternative embodiments the trolley system casters (208) are replaced with ball bearing slide assemblies that allow for easy telescoping of the telescoping base (204). It is imperative that the trolley system casters (208) can support the load of the saw blade motor (210) and saw blade (214) and that they are stabilized to minimize vibration and increase precision in cuts.

In FIG. 2 the saw blade motor (210) resides mounted to the telescoping base (204) which is held in place by the trolley system to the orbiting base (201). The saw blade motor (210) is a typical electrical saw blade motor and can also be an alternative motor such as a magnetic drive, liquid fuel, or other motor that enables high rotational capacity for a saw blade. The saw blade (214) is equipped to the saw blade motor (210) and sits attached to the telescoping base (204). When a user pushes or pulls the telescoping base (204) within the orbiting base (201) the saw blade (214) travels along the axis of the throat plate (216), allowing for cuts without having to do any advanced arrangement of the table miter saw configuration. This type of rapid profiling and rapid configuring is just one benefit of many that will appear to those of skill in the art.

Continuing with the example embodiment of FIG. 2, the casters (202) along with the bottom swivel (226) bear the load of the orbiting base (201). In alternative embodiments the bottom swivel (226) is removed and the casters (202) alone support the weight of the orbiting base (201). Notably, the orbiting base (201) is comprised of rigid material and can be made out of metal, wood, or durable and strengthened plastic components. The orbiting base (201) is also dampened and adjusted to handle vibrations from the telescoping base that houses the saw blade motor (210). Typical dampening equipment includes rubber stoppers, rubber insulation, foam insulation, and other materials that are utilized to reduce vibrations in an industrial setting.

Figure 3:
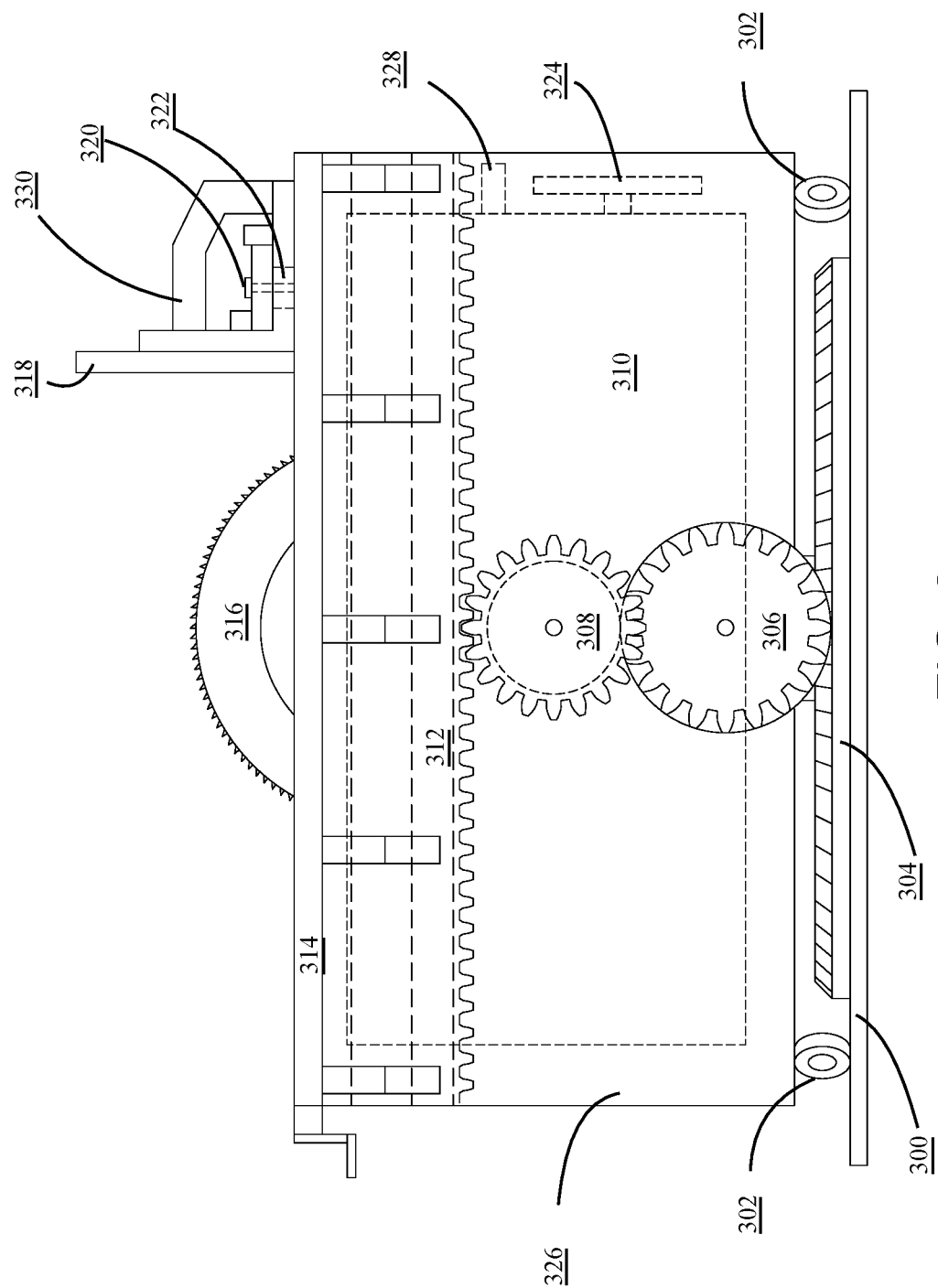
FIG. 3 is a side view schematic diagram of an example embodiment of a table miter saw as disclosed herein.

FIG. 3 is a side view diagram displaying the swivel gear assembly system that drives the rotation for the configuration of mitering with the table miter saw. The bottom platform (300) has the bottom bevel gear (304) attached to form the main orbital axis of 180-degrees. The bottom bevel gear (304) is in direct contact with the top bevel gear (306) that drives the compound gear (308) that interacts with the rack gear (312) adding force to the side shelf (314) that moves the orbiting base (326). The interaction between these gears allows for precise movement and selection of mitering degree. The mitering degree can then be locked in plan by a pin lock on the orbiting base (326) or by a pawl in any one of the rotating gears in the swivel gear assembly.

In the example embodiment of FIG. 3 the casters (302) bear the load of the orbiting base (326) and support the internal telescoping base (310). Additional embodiments have a swivel gear bearing weight and the casters (302) aiding in support and rotational capacity. The casters (302) are industrial and capable of supporting loads of the orbiting base (326) and any material that is to be processed, examples of such material include various types of wood, metals, plastics, and any other material that is known to be processed on a table saw or miter saw. The orbiting base (326) has the top shelf and the side shelf (314) mounted to it and in direct contact. The orbiting base (326) further houses the telescoping base (310) and is supported by a trolley system.

In the example embodiment a blade height wheel (324) is depicted that raises and lowers the elevation of the saw blade (316). In other embodiments a tilt wheel is present and allows the saw blade (316) to tilt to perform bevel cuts. A handle (328) is affixed to the telescoping base (310) and provides the user with a safe and effective way of mitering material on the top shelf. The handle (328) moves in line with the throat plate and is equipped for pushing and pulling motions. Different safety mechanisms can be embedded in the handle such as a safety shut off and a hold-to-start trigger. Other safety mechanisms such as blade stoppage can be equipped anywhere in the design and will be apparent to those of skill in the art.

In the example embodiment of FIG. 3, the rear fence (318) is equipped for mitering cuts. The rear fence (318) moves along the rear fence rail system (330) in the trunnion groove (322) by a mounted trunnion bearing (320). The trunnion groove (322) is arched to form the degree angle of miter cut as it is influenced by the side shelf (314) and the swivel gear assembly. Thus, the system moves as one entire piece as the orbiting base (326) is pivoted the swivel gear assembly moves the side shelf (314) which in turn moves the rear fence assembly (330) to the corresponding miter degree. The ratio of rotation on the bottom bevel gear (304) corresponds to the amount of miter degree and is influenced by the size of the corresponding top bevel gear, (306) and compound gear (308), and the rack gear (312). Alterations in size of the gears is understood and disclosed, the principle remains the bottom bevel gear grants (304) 180 degree turning radius which in turn allows for mitering angles of 45 degrees of less. Alternating the position of the material to be cut gives the additional 45-degree range. As previously discussed the saw blade further contains the ability to bevel and along with the miter angle can perform bevel and miter cuts simultaneously. In the example embodiment of FIG. 3 the telescoping base (310) can be locked in place by any mechanism that is capable of holding the position such as a lock and pin or pawl on the trolley system. Similarly, the orbiting base can be locked in place to the bottom bevel gear (304) or through the casters (302) or the swivel assembly, if present, and the table miter saw will be placed in table saw configuration for ripping of material.

Figure 4:
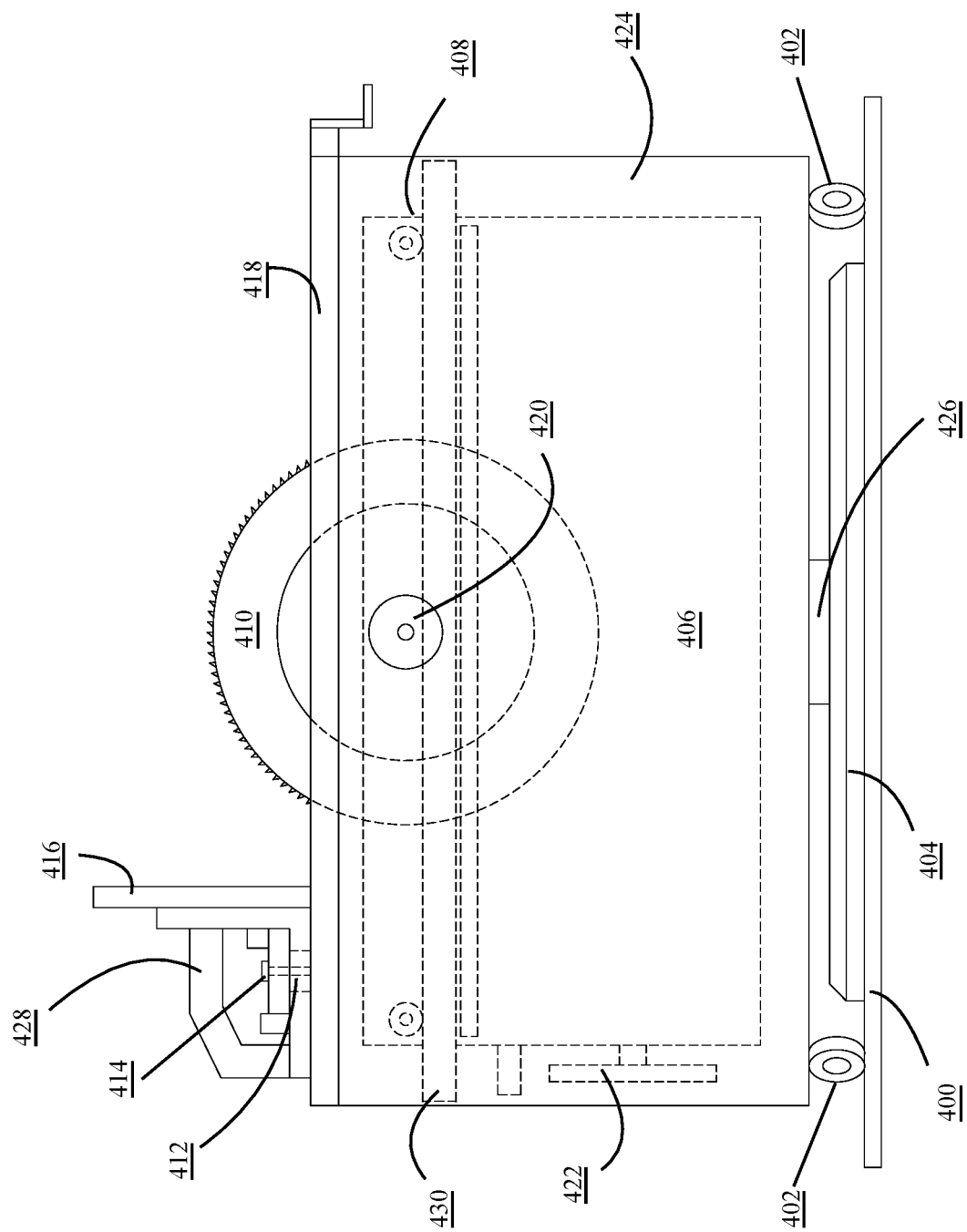
FIG. 4 is an additional side view schematic diagram of an example embodiment of a table miter saw as disclosed herein.

Turning now to the example embodiment in FIG. 4, an opposite side view of FIG. 3 is presented showing the internal telescoping base (406). The bottom bevel gear (404) is attached to the bottom platform (400). The bottom platform (400) is capable of being mounted to other materials including legs, stands, risers, sawhorses, tabletops, or other platforms that provide the weight bearing capacity and strength to hold the table miter saw. Casters (402) are present and aid in the pivoting of the orbiting base (426). The bottom bevel gear (404) is depicted from the rear side as here are no teeth present, this depicts the 180 dimensions of the bottom bevel gear (404). The top bevel gear is located behind the swivel gear. The telescoping base (406) resides on the trolley system (408) that consists of four casters on a pair of rails that allow the telescoping movement of the saw blade (410) within the throat plate. A blade height wheel (422) raise and lowers the saw blade (410) by rotating a wheel that in turn moves a worm gear that raises and lowers the saw blade (410) and saw blade motor. An arbor (420) that holds the saw blade (410) in place on the saw blade motor and can be utilized to change out the varying types of saw blades. The miter fence (416) is attached to the rear fence rail system (424) that glides in place of the trunnion groove (412) by a trunnion bearing (414). Additional disclosure is a bear assembly in place of the trunnion groove (412) and trunnion bearing (414) that allows for miter angle movement from the side shelf. The top shelf (418) contains the throat plate and is where the material to be processed is sat upon. The top shelf (418) is typically made out of a strong metal and sometimes wood or other compound that possesses strong rigidity and the ability to endure repetitive mechanical stresses. Notably, the table miter saw in example embodiment 4 possesses rubber bumpers or rubber shock absorption on the various components such as the trolley system (408) to dampen the effects of vibration from the saw blade motor.

In the example embodiment of FIG. 4 the trolley system (408) rides on a trolley system rail (430) that allows for the telescoping movement. The trolley system rail (430) may also be a bearing assembly, wherein the casters are replaced with a series of bearings in a rail, much like one would see in an industrial door. The rail system (408) being rigid and capable of bearing the weight and movement of the saw blade (410) and the saw blade motor.

Figure 5:
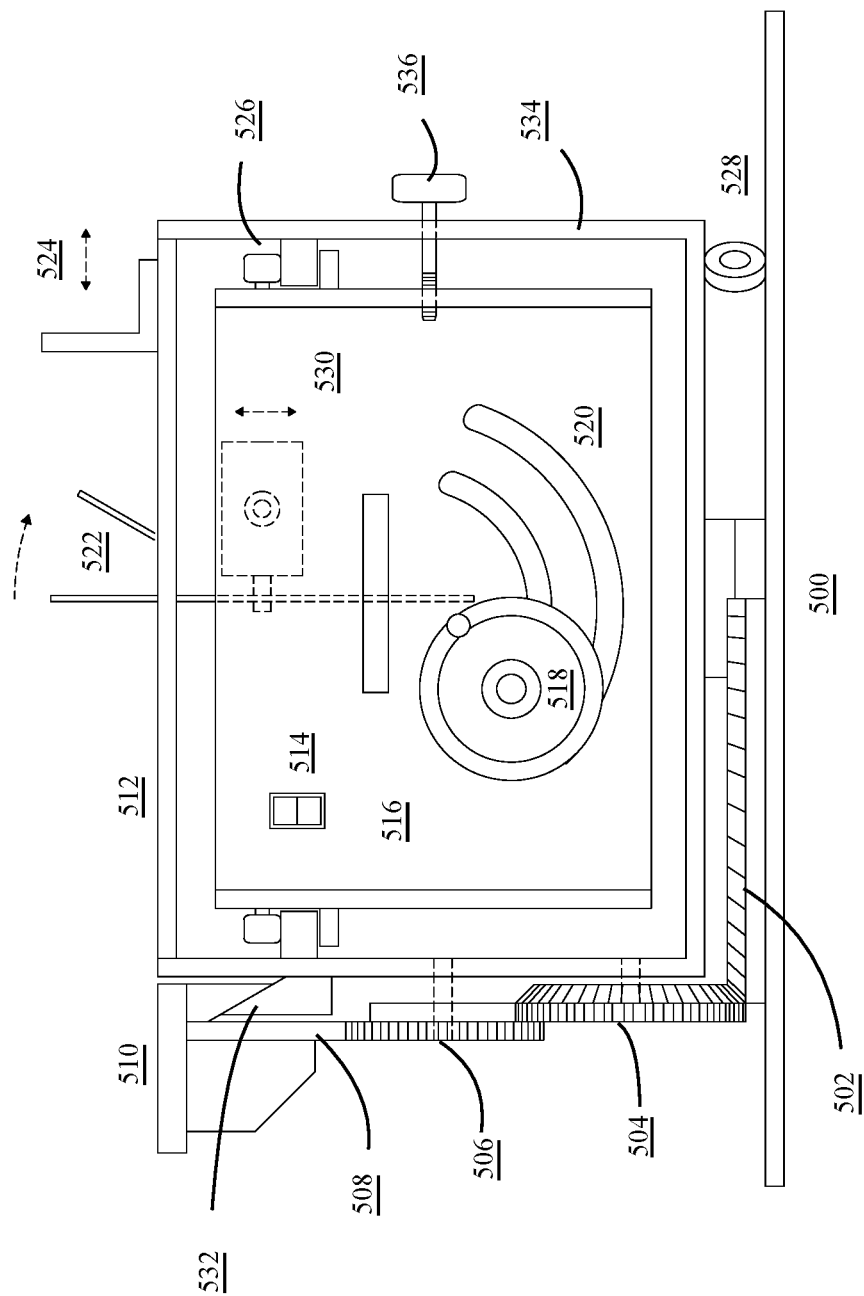
FIG. 5 is an additional side view schematic diagram of an example embodiment of a table miter saw as disclosed herein.

FIG. 5 is an example embodiment of the front side of the table miter saw, most often the user side of the table miter saw when configured for mitering. The bottom platform (500) has the bottom bevel gear (502) configured to remain fixed in place. The bottom bevel gear (502) is configured to the top bevel gear (504) which in turn is configured to the compound gear (506). By rotating the orbiting base (536) the top bevel gear (504) rotates the compound gear (506) which moves the side rail rack gear (508). The side rail rack gear (508) is attached to the side shelf (510) that sits within a side shelf rail system (532). The side shelf rail system (532) is a rail system that holds the side shelf (510) in place alongside the orbiting base (536). In the example embodiment the side shelf rail system (532) is a notched metal component with lubrication between the metal pieces to allow for gliding as the orbiting base (536) is pivoted with the side shelf (510). In additional embodiments the side shelf rail system (532) is a bearing assembly that allows for the movement of the side shelf (510) alongside the orbiting base (536). The telescoping base (516) houses the saw blade motor (530) and all the components that belong to the saw blade motor (530) to allow it to operate. Typical components include the blade height wheel (518) along with the blade tilt adjustment (520). The saw blade motor (530) is positioned within the telescoping base (516) and the saw blade (522) protrudes through the top shelf (512) of the orbiting base (536). The top shelf (512) is configured for a plurality of rail systems that will be apparent to those of skill in the art, such as a miter rail, a guide fence, a side fence, a miter fence, and other such items that are traditionally found on table saws and miter saws.

The locking pin (528) locks the telescoping base (516) into the position on the orbiting base (536) for table saw configuration when conducting rip cuts. The telescoping base (516) is further configured with a handle and a power switch (514). The handle allows the user to push and pull the telescoping base (516) within the orbiting base (536) for miter cuts when in miter configuration. The rip fence (524) fits in a channel on the top shelf (512) and aids in the ripping of material when in table saw configuration.

Figure 6:
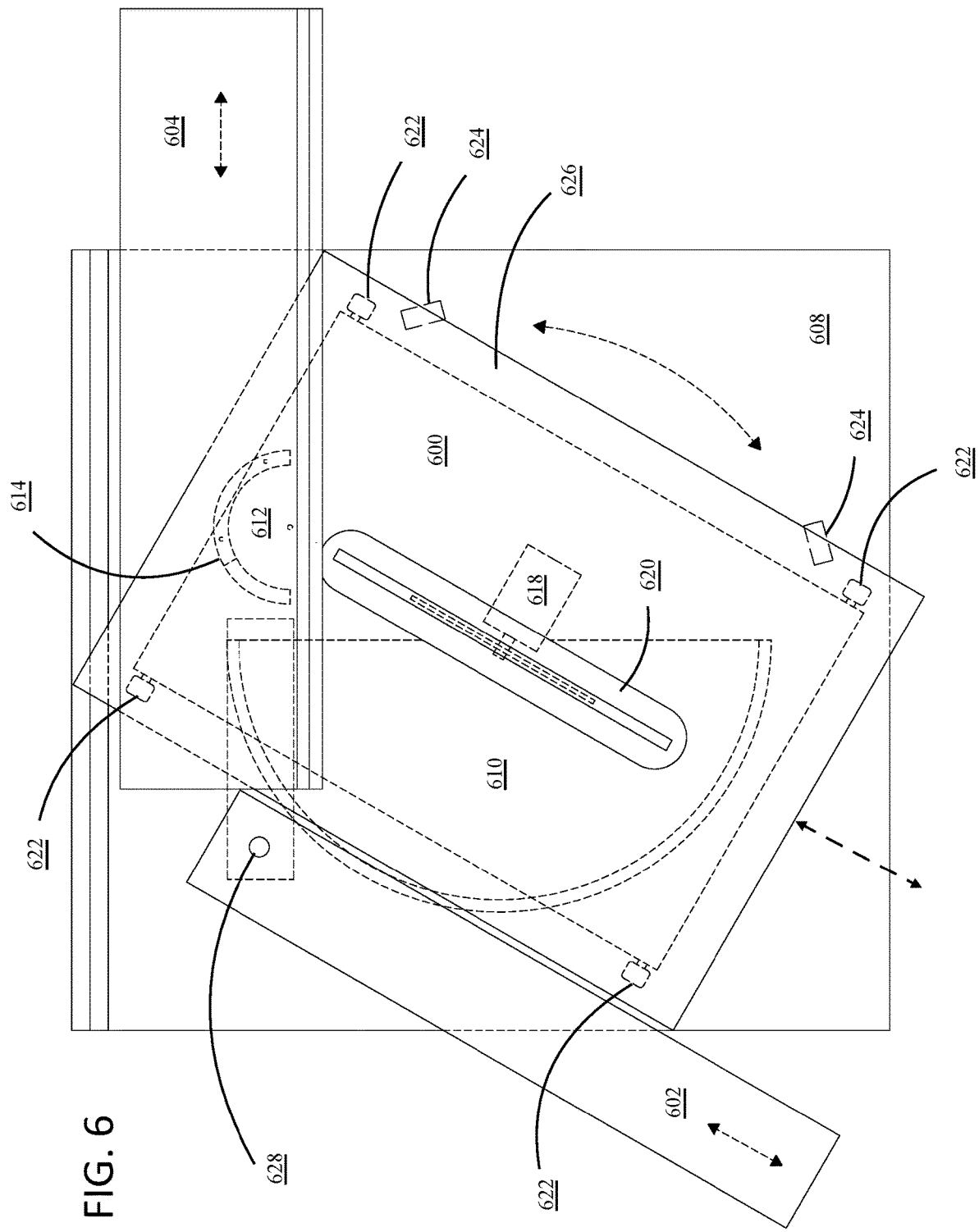
FIG. 6 is a top down view schematic diagram displaying movements of an example embodiment of a table miter saw as disclosed herein.

In the example embodiment of FIG. 6 a top down view of the table miter saw is presented. This view of just one example embodiment highlights the table miter saw movement when it is configured to miter. In the miter configuration the side shelf (602) slides alongside the orbiting base (626), held in place by the side shelf rail system and a pivot joint (628). The orbiting base (626) sits upon the casters (624) and swivels in place with input from the user. The swiveling is in turn connected to the bottom bevel gear (610) that controls the swivel gear assembly.

In the example embodiment of FIG. 6 the bottom bevel gear (610) is engaged with the top bevel gear, the compound gear, and the rack gear to position the table miter in a mitering arrangement. The trolley system (622) holds the telescoping base (600) housed within the orbiting base (626). The trolley system (622) allows the saw blade motor (618) to travel the length of the throat plate (620) positioned on the top shelf. The bottom platform (608) bears the weight of the orbiting base (626) and is configured for rapid setup and capable of being moved depending on the location of the worksite or jobsite. The bottom platform (608) is held in place and is found with rubber feet to reduce vibration noise and vibration patterns.

The trunnion groove (614) is formed into the top shelf and the trunnion groove (614) holds the rear fence and the rear fence rail system (604) in position as it moves laterally for miter cuts. The trunnion bearing (612) follows the trunnion groove (614) and is equipped with a means to stop the trunnion in a position for mitering such as a lock pin. Additionally, the orbiting base (626) and the bottom platform (608) are also equipped with a lock pin or a pawl mechanism that can fix the table miter saw in position for specific set miter cuts or for rip cuts.

In the example embodiment of FIG. 6, movements of the side shelf (602), the orbiting base (626), the telescoping base (600) are depicted with dashed lines and arrows showing the general direction of movement. It will be apparent to those with skill in the art that this configuration may contain different styles and shapes of gears in the swivel gear assembly to achieve the movement depicted in FIG. 6. In FIG. 6 the casters are bearing type casters, in alternative embodiments the casters on the orbiting base (626) and the telescoping base (600) are equipped with bearing rails that allow for the rotational and singular axis movement.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system for mechanically cutting material, the system comprising:
   (i) a fixed bottom platform;
   (ii) a swivel gear assembly configured to the fixed bottom platform, comprising:
      (a) a bottom bevel gear attached to the fixed bottom platform along the same plane;
      (b) a top bevel gear oriented to receive the bottom bevel gear, wherein the top bevel gear and the bottom bevel gear interlock;
      (c) a compound gear configured to receive the top bevel gear, wherein the compound gear and the top bevel gear interlock; and
      (d) a rack gear configured to receive the compound gear, wherein movement along the bottom bevel gear interacts with the top bevel gear that further interacts with the compound gear that allows the rack gear to move a side shelf rail system that moves a single side shelf;
   (iii) an orbiting base wherein the top bevel gear and the compound gear are configured to the orbiting base, the orbiting base further equipped to orbit along a rotatable path of the bottom bevel gear wherein four casters support the orbiting base;
   (iv) a telescoping base located interior of the orbiting base, comprising:
      (a) a base capable of locking into place;
      (b) a trolley system including a plurality of rails and casters;
      (c) a saw blade motor; and
      (d) a saw blade configured to the saw blade motor,
   (v) a top shelf having a trunnion groove and a throat plate, wherein the top shelf is fixed to the orbiting base and is equipped to orbit along a rotatable path of the bottom bevel gear, and wherein the telescoping base telescopes the saw blade within the throat plate of the top shelf;
   (vi) a rear fence rail system located on top of the top shelf, comprising
      (a) a rear fence;
      (b) a trunnion bearing; and
      (c) a pivot joint configured to the single side shelf, wherein the rear fence is equipped to orbit along a rotatable path of the bottom bevel gear and in connection with the single side shelf.

2. The system of claim 1, wherein the top shelf further comprises a channel for a rip fence.

3. The system of claim 1, wherein the orbiting base comprises a blade height wheel.

4. The system of claim 1, wherein the telescoping base is configured with a handle.

5. The system of claim 1, wherein the top shelf includes a rip fence.

6. The system of claim 1, wherein the bottom bevel gear is a 180-degree bevel gear.

7. The system of claim 1, wherein a pawl is configured to either the bottom bevel gear, the top bevel gear, the compound gear, or the rack gear.

8. The system of claim 1, wherein the orbiting base is composed of wood or metal alloy.

9. The system of claim 1, wherein the trunnion groove is arched to form the degree angle of miter cuts.

* * * * *